July 31, 1962 E. P. HAMILTON ETAL 3,047,731
MAGNETIC CORE CIRCUIT
Filed July 14, 1958 3 Sheets-Sheet 1

INVENTORS
HAROLD R. DELL
EUGENE P. HAMILTON
RAYMOND M. TREBINO

BY Samuel E. Turner AGENT

INVENTORS
HAROLD R. DELL
EUGENE P. HAMILTON
RAYMOND M. TREBINO
BY Samuel E. Turner AGENT

INVENTORS
HAROLD R. DELL
EUGENE P. HAMILTON
RAYMOND M. TREBINO

BY Samuel E. Turner AGENT

United States Patent Office 3,047,731
Patented July 31, 1962

3,047,731
MAGNETIC CORE CIRCUIT

Eugene Preston Hamilton, Richmond, Raymond Manuel Trebino, Martinez, and Harold Raymond Dell, Palo Alto, Calif., assignors, by mesne assignments, to Smith-Corona Marchant Inc., a corporation of New York
Filed July 14, 1958, Ser. No. 748,287
7 Claims. (Cl. 307—88)

Figure 1:
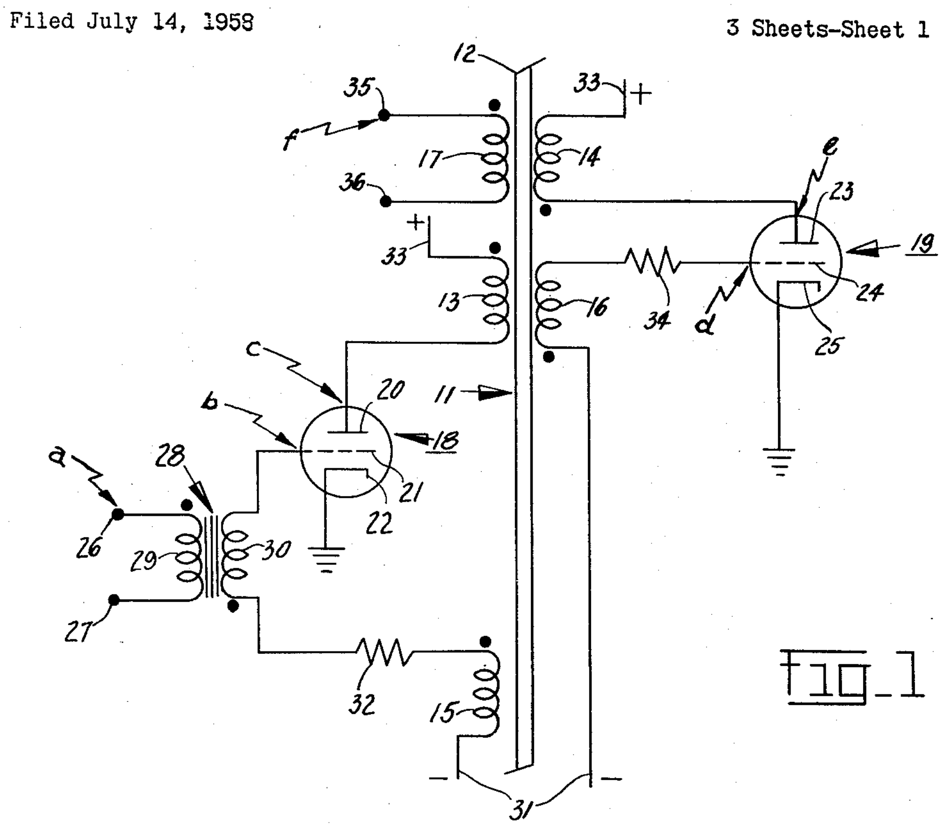

The invention relates to a magnetic core circuit useful as a coordinate driver in a magnetic storage.

A practical magnetic storage of the saturable core type may consist of a three dimensional array of rows and columns of cores. Each core lies simultaneously in a Y-Z plane, an X-Z plane, and an X-Y plane. Thus, each core will have, respectively, an X coordinate, a Y coordinate, and a Z coordinate, and designation of these coordinates will give the unique location of any core in the storage. A saturable magnetic core is saturated in a given sense to represent by its remanent condition, the binary digit "1" or unit, and is saturated in the opposite sense to represent by its remanent condition in this sense the binary digit "0" or naught. Thus, binary information may be stored in a magnetic core storage through control of the magnetic sense of the individual cores. For example, in a magnetic core storage all of whose cores are initially in a magnetic sense designated as corresponding to a unit binary digit, saturating a single core in the opposite sense may be said to store a naught binary digit in that particular core.

Each core in the storage is provided with an X coordinate winding, a Y coordinate winding, and a Z coordinate winding. Windings of a given coordinate for cores located in the corresponding plane are serially connected to a source of driving current. For example, cores located in a given Y-Z plane have their X coordinate windings connected in series, the circuit terminating at a current source which is the X coordinate driver for that particular Y-Z plane. In addition, each core has an inhibiting winding and a sensing winding. The inhibiting windings of all of the cores in the storage are serially connected, the circuit terminating at a current source which is the inhibit driver. The sensing windings of all of the cores in the storage are serially connected to form the storage output circuit.

For the purpose of explanation of the operation of the storage, let it be assumed that the cores of the storage are initially in the unit sense, i.e., a unit is stored in each core, and it is desired to write a naught into a particular core. Let the current necessary to switch a single core from the unit sense to the naught sense be $I_0$, and the current necessary to switch a single core from the naught sense to the unit sense be $-I_0$. The Y-Z plane containing the core receives a current of $I_0/2$, by means of the appropriate X coordinate driver and X coordinate windings; the X-Z plane containing the core receives a current of $I_0/2$, by means of the appropriate Y coordinate driver and Y coordinate windings; the X-Y plane containing the core receives a current of $I_0/2$, by means of the appropriate Z coordinate driver and Z coordinate windings; and all of the cores in the storage receive a current of $-I_0/2$ through the serially connected inhibiting windings. Those cores which do not lie in one of the energized Y-Z, X-Z, or X-Y planes receive only the $-I_0/2$ inhibiting current, and remain in the unit sense. Those cores lying in only one of the energized planes receive an $(I_0/2-I_0/2)=0$ current, and remain in the unit sense. Those cores lying in the straight line intersection of any two energized planes receive an $$(I_0/2+I_0/2-I_0/2)=I_0/2$$

current and remain in the unit sense. That single core lying at the point of intersection of the three energized planes receives an $$(I_0/2+I_0/2+I_0/2-I_0/2)=I_0$$

current and therefore its magnetic sense is changed from unit to naught.

Setting a core to the unit sense is accomplished by means of an analogous process, in which the coordinate windings receive currents of $-I_0/2$ and the inhibiting windings receive a current of $I_0/2$. Such a setting process is also utilizable to read information contained in a core of the storage, as the absence of an output pulse in the output circuit indicates that a unit was stored in the core read while the presence of an output pulse indicated that a naught was stored in the core read. However, as the core which is read is always put in the unit sense by being read, it is desirable to rewrite the information read from the core. Rewriting of information is accomplished by means of a process analogous to the storing of information. The output of the storage is used to indicate whether the particular core which was read, and is now in the unit sense, was previously in the naught sense. When an output pulse appears in the sensing winding on reading, thereby indicating that the core read contained a naught, the core is returned to the naught state by application to the coordinate and inhibiting windings of the $I_0/2$ forces, as previously described for writing. However, if no output appears in the sensing winding, the core read previously contained a unit. In order to prevent the writing of an erroneous naught into the core, the current in one of the planes is inhibited. Thus, no core receives a current greater than $+I_0/2$, and all cores retain the unit sense.

In magnetic storage systems it is often desirable to generate a read current pulse immediately followed by a rewrite pulse, in order to rewrite the information just read out of the system. Previous magnetic core memory systems have used blocking oscillators and flip-flops to generate the read, write, and rewrite drive currents. The waveform produced by the conventional blocking oscillator is by itself unsatisfactory for this purpose. The conventional flip-flop has insufficient output to directly drive a magnet core. The invention relates to circuits useful in generating either single read, write, inhibit, or rewrite pulses, or read-rewrite pulse pairs. However, in addition to its uses as a magnetic core driver, a circuit according to the invention may be adapted to other uses, such as a square wave generator.

An object of the invention is to produce a magnetic storage driving pulse of proper wave form and of sufficient power with a simple circuit.

Another object of the invention is to provide an improved pulse generator whose output is utilizable as a driving pulse in a magnetic storage.

Another object of the invention is to produce periodic pulses essentially square in shape and having substantial power.

Another object of the invention is to increase the reliability of magnetic storage driving pulse generators.

According to the invention, a triggered regenerative driver circuit includes a transformer, comprising a saturable magnetic core having two driving windings and at least one feedback winding thereon. The driver circuit also includes at least one amplifier, each amplifier included having one driving winding connected to its output circuit and one feedback winding connected to its input circuit.

A trigger input signal is applied to one amplifier causing the amplifier to conduct. The flow of current through the amplifier driving winding causes the magnetic sense of the saturable core to change. When the sense of the magnetic core has changed, the conducting amplifier circuit is cut off, and a second driving circuit causes the magnetic core to revert to its initial sense The circuit output consists of a square, voltage waveform induced in an output winding wound on the magnetic core.

Figure 2:
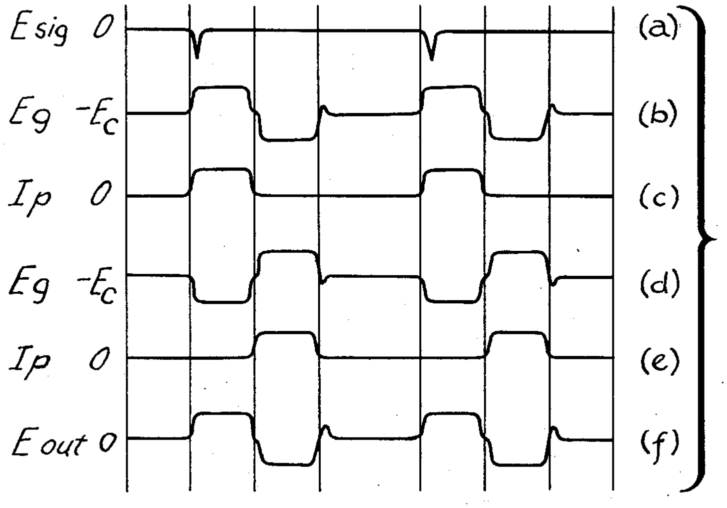
Figure 3:
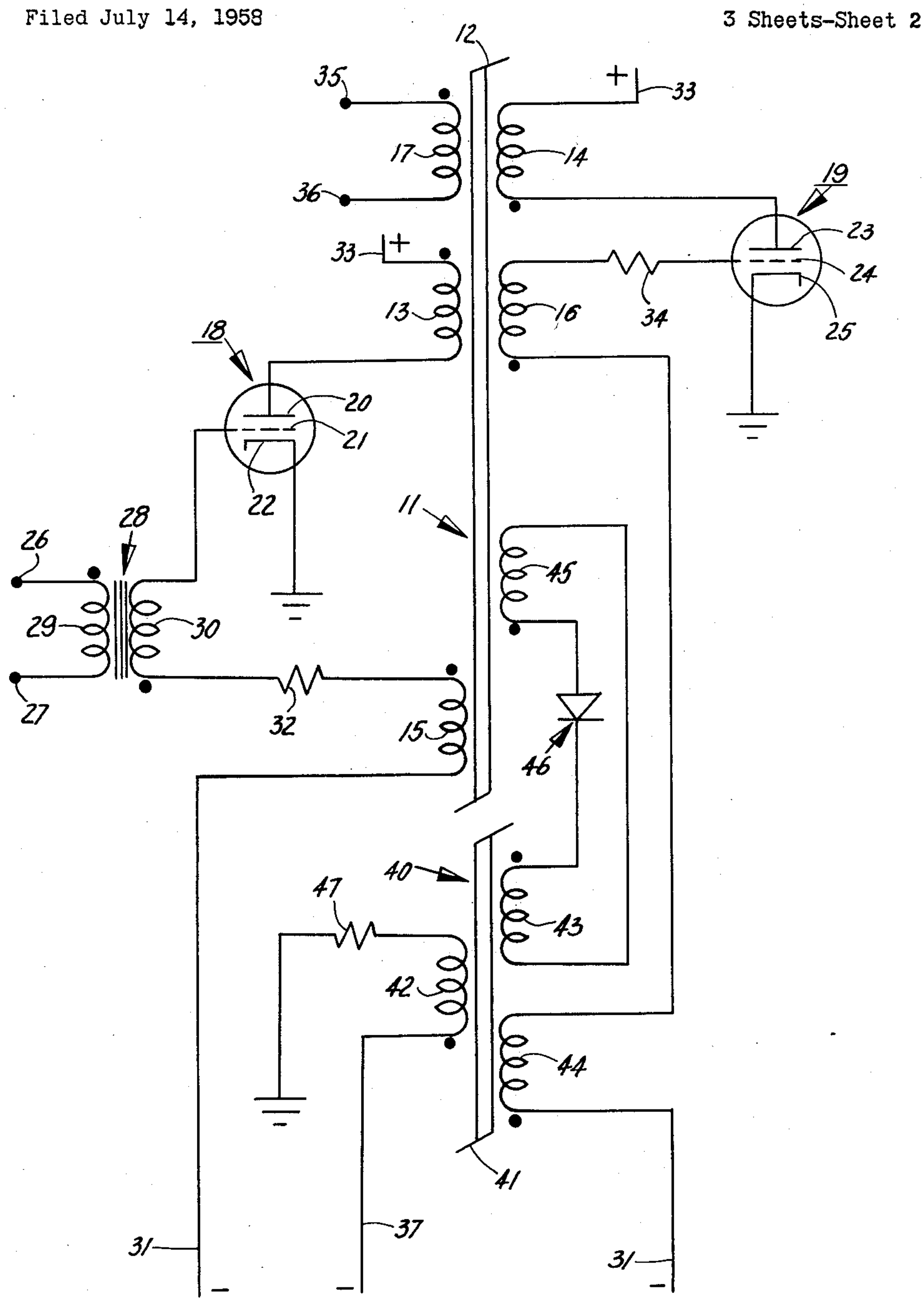
Figure 4:
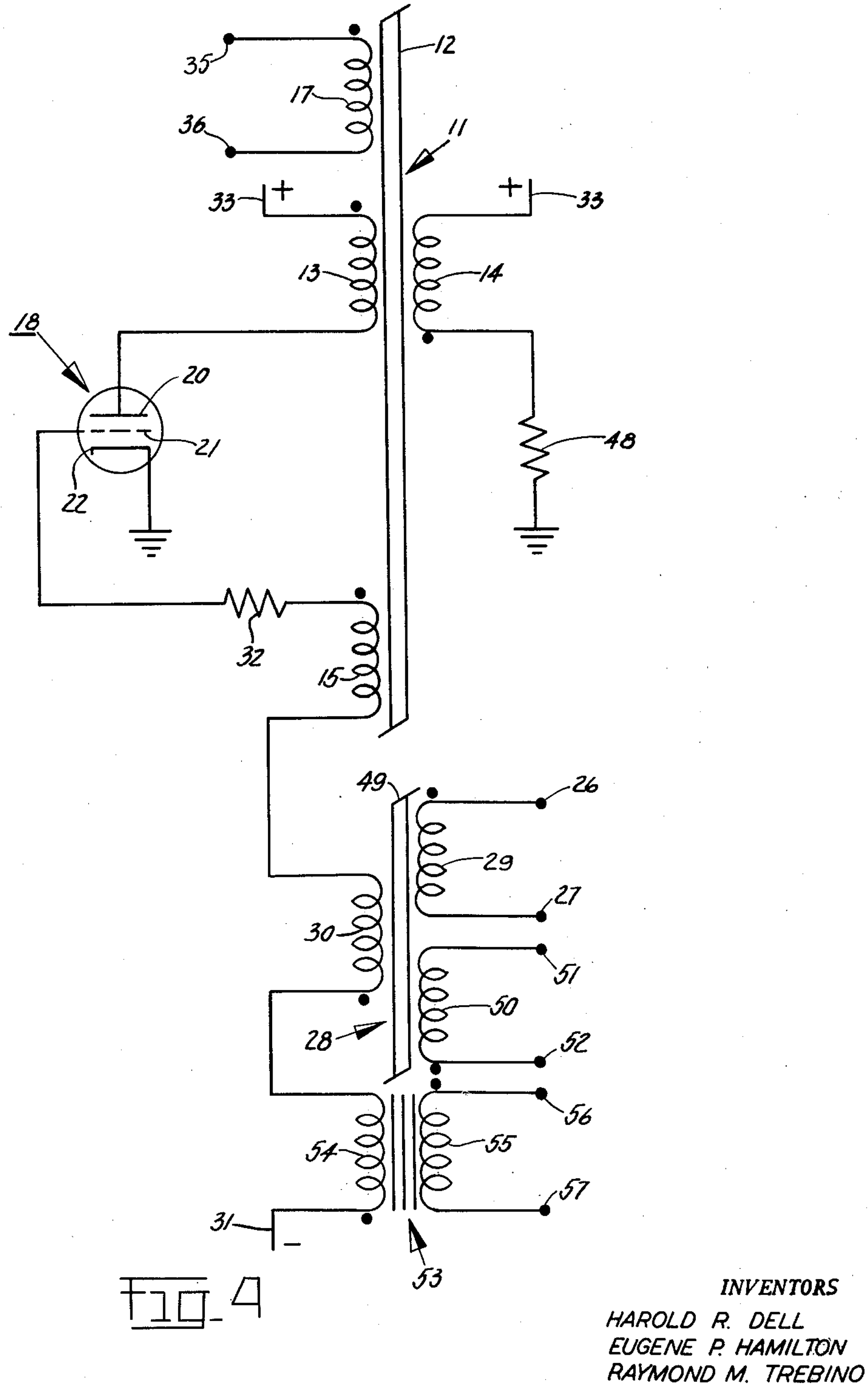

In order that the invention may be more readily understood and employed by others, it will be described in terms of express embodiments, given by way of illustration only, with reference to the drawing in which:

FIG. 1 is a schematic diagram of a regenerative driver according to the invention;

FIG. 2, sections (*a*) through (*f*) being taken together, is a graphical representation of the time base relationship of the input and output signals of the several elements in FIG. 1 according to the invention;

FIG. 3 is a schematic diagram of an alternative embodiment of the invention utilizable as a gated pulse generator; and FIG. 4 is a schematic diagram of an alternative embodiment of the invention utilizable as a single read, write or rewrite pulse generator.

Conventional dot notation is used in FIG. 1, FIG. 3, and FIG. 4 to indicate the relative polarity of transformer windings. Current flow into a dot termnal of the saturable core transformer corresponds to a negative magnetizing force which drives the saturable core to the naught sense.

The triggered regenerative driver circuit schematically diagrammed in FIG. 1 includes a saturable magnetic core transformer 11 having a saturable magnetic core 12 on which are wound a first driving winding 13, and a second driving winding 14, a first feedback winding 15, a second feedback winding 16, and an output winding 17. The saturable core 12 is illustrated only symbolically in FIG. 1. As is in accordance with the present practice with such devices, use of a closed ring core will be understood to be preferred.

Flux changes in the saturable core 12 are initiated by current flow through the first driving winding 13 and the second driving winding 14. Current flow through the first driving winding 13 is initiated by conduction of an amplifying means 18, hereafter referred to as the read amplifier. Current flow through the second driving winding 14 is initiated by conduction of an amplifying means 19, hereafter referred to as the rewrite amplifier. The read amplifier 18 and the rewrite amplifier 19 are illustrated in FIG. 1 as vacuum tube triodes together with associated circuitry. The read amplifier 18 has an anode 20, a grid electrode 21, and a cathode 22, and the write amplifier 19 has an anode 23, a grid electrode 24, and a cathode 25. However, it is to be understood that any amplification means may be utilized for the read and rewrite amplifiers, the triodes are shown in FIG. 1 by way of example only.

Trigger signals, FIG. 2(*a*), are applied to the input circuit of the read amplifier 18 (FIG. 1) at the input terminals 26 and 27 of a primary winding 29 of an input transformer 28. The trigger signals are coupled by the input transformer 28 through a secondary winding 30 to the grid electrode 21 of the read amplifier 18. Normally, current conduction by the read amplifier 18 is held cut off by means of a negative bias applied at a grid bias input 31 through the feedback winding 15 of the read amplifier 18, a grid resistor 32, and the secondary winding 30, to the grid electrode 21. An anode voltage for the anode 20 of the read amplifier 18 is applied at an anode voltage input 33, through the driving winding 13, to the anode 20.

The circuit of the rewrite amplifier 19 is identical to that of the read amplifier 18, except that no input transformer is included or required.

Flux changes in the saturable core 12, caused by current flow through the driving windings 13 and 14, induce voltages across the core output winding 17 which is connected to a pair of output terminals 35 and 36.

The driving windings 13 and 14 are so connected to their respective amplifiers 18 and 19 that current flow through the driving winding 13 and its associated amplifier 18 will tend to magnetize the core in a sense opposite to the sense in which current flow through the driving winding 14 and its associated amplifier 19 tends to magnetize the core. The driving winding 13 is coupled to the feedback windings 15 and 16 by means of magnetic core coupling. The driving winding 14 is similarly coupled to the feedback windings 15 and 16. The driving winding 13 is in addition coupled to the feedback winding 16 through air by virtue of being wound directly on said feedback winding 16. The combined air and magnetic coupling between the driving winding 13 and the feedback winding 16 therefore is appreciably greater than the coupling between the driving winding 14 and the feedback winding 15.

The feedback windings 15 and 16 are so wound on the saturable core 12 and are so connected to the amplifiers 18 and 19 that an increase in the anode current flowing in one of the amplifiers induces in a positive feedback voltage in the feedback winding of that amplifier and a voltage of opposite polarity across the feedback winding of the other amplifier. For example, an increase in the current flowing through the driving winding 13 causes a positive voltage to be induced across the feedback winding 15 and a negative voltage to be induced across the feedback winding 16, the voltages being taken with respect to the potential of the negative bias supply 31.

Assuming that the saturable magnetic core 12 is initially in the positive remanent condition designated as and hereafter referred to as the unit state, a negative input trigger pulse is applied across the input terminals 26 and 27 of the input transformer 28. The windings of the input transformer 28 are connected so as to invert the input pulse and apply a positive voltage pulse to the amplifier grid electrode 21. This positive voltage pulse is of sufficient magnitude to overcome the cutoff bias applied to the amplifier 18, and the amplifier 18 therefore commences to conduct current. The current flow from the amplifier anode 20 through the amplifier driving winding 13 induces a change in the magnetic flux of the saturable core 12, causing the saturable core 12 to change from the unit state toward the saturated naught sense. The changing flux induces a positive voltage in the feedback winding 15 of sufficient magnitude to continue current conduction in the amplifier 18 after termination of the input trigger pulse. Therefore, current continues to flow through the amplifier 18 until the saturable core 12 becomes saturated in the naught sense. The saturation of the saturable core 12 in the naught sense, by completing the flux change in the core 12, terminates the positive voltage induced across the feedback winding 15. The negative bias applied at 31 thereupon cuts off current conduction in the amplifier 18 and the saturable core 12 relaxes from the saturated naught sence to the remanent naught condition, designated as and hereafter referred to as the naught state.

Due to the squareness of the hysterisis characteristics typical of saturable magnetic cores, relaxation to the remanent state causes only a slight change in the core flux. This slight change in flux in the saturable core 12 induces a positive voltage across the feedback winding 16 which is, however, insufficient to cause the amplifier 19 to conduct current. However, the feedback winding 16 also has, by virtue of being wound about the same center as driving winding 13, significant air coupling to driving winding 13. The conduction of current through driving winding 13 sets up an electromagnetic field around said winding 13. Upon the termination of current conduction by amplifier 18, this electromagnetic field collapses. The driving winding 13 and feedback winding 16 are wound and connected so that the collapse of this electromagnetic field induces a positive voltage across feedback winding 16. The combined positive voltages induced in the feedback winding 16 by the change in flux in the saturable core 12 upon relaxation and by the collapse of the electromagnetic field around driving winding 13 are sufficient to overcome the cutoff bias applied to the amplifier 19, and the amplifier 19 therefore commences to conduct current. The current flow from the amplifier anode 23 through the amplifier driving winding 14 induces a change in the magnetic flux of the saturable core 12, causing the core 12 to change from the naught state toward the saturated unit condition. This flux change in the saturable core 12 induces a positive voltage across the feedback winding 16 sufficient to cause the amplifier 19 to continue to conduct current until the saturable core 12 becomes saturated in the unit condition. The saturation of the saturable core 12 in the unit sense, by completing the flux change in the core 12, terminates the positive voltage induced in the feedback winding 16. The negative bias applied at 31 thereupon cuts off current conduction in the amplifier 19 and the saturable core 12 relaxes to the unit state.

Due to the squareness of the hysterisis characteristics typical of saturable magnetic cores, relaxation to the remanent state causes only a slight change in the core flux. This slight change in flux in the saturable core 12 induces a positive voltage across the feedback winding 15 which is, however, insufficient to cause the amplifier 18 to conduct current. The coupling between the feedback winding 15 and the driving winding 14 through air is not significant as compared to the coupling through air between the feedback winding 16 and the driving winding 13. Thus, although the electromagnetic field around driving winding 14 collapses upon termination of current conduction in amplifier 19, the voltage induced in feedback winding 15 by this collapse is not significant as compared to that which is induced in feedback winding 16 upon termination of current conduction in amplifier 18. Therefore, the combined positive voltages induced in the feedback winding 15 by the change in flux in the saturable core 12 upon relaxation and by the collapse of the electromagnetic field around the driving winding 14 are insufficient to overcome the negative bias applied at 31, and amplifier 18 remains in a cut off condition.

Changes in flux in the saturable core 12 induce voltages in the output winding 17 as shown in FIG. 2(*f*).

Graphical representations of the waveforms obtained with the circuitry just described are shown in FIG. 2 (sections *a*, *b*, *c*, *d*, *e*, and *f* being taken together).

The regenerative circuit of FIG. 1 may be arranged to provide a continuous series of alternate positive and negative output pulses once the circuit is triggered into operation. This is accomplished by winding the feedback winding 15 about the same center as driving winding 14 so that the air coupling between these windings is the same as the coupling between feedback winding 16 and driving winding 13 as previously described. With this arrangement the collapse of the electromagnetic field around a drive winding due to the cessation of current flow through the associated amplifier causes the triggering of the other amplifier. Thus the circuit freely oscillates from conduction by one amplifier to conduction by the other until the circuit operation is terminated by some external means. The operation of the circuit may be terminated, for example, by momentarily increasing the bias potential to the amplifiers.

The regenerative driver circuit schematically diagrammed in FIG. 1 utilizes coupling through air between the feedback winding 16 and the driving winding 13 in order to trigger the amplifier 19. The regenerative driver schematically diagrammed in FIG. 3 illustrates an alternative embodiment of the invention utilizing an additional saturable core to produce the additional voltage coupling achieved in the circuit of FIG. 1 through the use of coupling achieved in the circuit of FIG. 1 through the use of coupling through air. Component numbers in FIG. 3 corresponding to components in FIG. 1 refer to identical components. The additional circuitry of FIG. 3 includes a saturable core coupling transformer 40 which has a saturable core 41, a D.-C. bias winding 42, an input winding 43, and an output winding 44. The input winding 43 is connected to an additional output winding 45 on the saturable core transformer 11 through an isolating diode 46.

The operation of the amplifier 18 of FIG. 3 in response to an input signal is identical to the operation of the amplier 18 of FIG. 1. The changes in flux in the saturable core 12 induce voltages across the output winding 45. The diode 46 is connected so that current is conducted through the diode 46 only when the saturable core 12 changes from the unit to the naught sense. Current conduction by the diode 46 completes the circuit between the winding 45 and the winding 43, and the saturable core 41 is set thereby to the naught sense. Current conduction through the D.-C. bias winding 42 is not sufficient to prevent the current flow in input winding 43 from setting the core 41 to the naught sense. However, the current flow through the input winding 43 terminates when the saturable core 12 becomes saturated in the naught sense. Thereupon the current flow through the D.-C. bias winding 42 causes the saturable core 41 to become saturated in the unit sense. This change in the magnetic sense of the saturable core 41 to the unit state induces a positive voltage across the output winding 44 which is applied to the write amplifier 19. This positive voltage is of sufficient magnitude to overcome the negative bias applied to the amplifier 19, and the amplifier 19 commences to conduct current. Operation of the amplifier 19 after current conduction commences is identical with the operation of the amplifier 19 of FIG. 1.

Other methods of achieving a difference in the signal coupled between the respective amplifiers 18 and 19 include the use of a non-saturable material in conjunction with saturable material and the use of different numbers of turns for the corresponding driving and feedback windings. For example, if the driving winding 13 and the feedback winding 16 are wound over both the saturable core material and additional magnetic material not exhibiting a square loop characteristic, a greater voltage is induced across the feedback winding 16 upon relaxation from the saturated to the remanent state than is induced by a similar relaxation when the core consists of only square loop characteristic material. Also, if the number of turns in the feedback winding 16 is greater than the number of turns in the feedback winding 15, the voltage induced in the feedback winding 16 is greater than the voltage induced in the feedback winding 15 as the core relaxes from the saturated to the remanent state.

The regenerative driver circuit schematically diagrammed in FIG. 4 illustrates another alternative embodiment of the invention. Component numbers in FIG. 4 corresponding to numbers in FIG. 1 refer to similar components.

The operation of the amplifier 18 of FIG. 4 is essentially the same as that described for the amplifier 18 of FIG. 1. The amplifier 19 of FIG. 1, however, is omitted and the driving winding 14 and a current limiting resistor 48 are connected in series between the anode voltage supply 33 and ground. Thus the current flow through winding 14 acts normally to bias the core 12 to saturation in a first magnetic sense and to return the core 12 to its initial saturation state immediately following an operation of amplifier 18.

Additional circuitry, shown in FIG. 4, provides a means for gating the operation of the circuit. The input transformer 28 of FIG. 4 has a saturable core 49 and an arming winding 50. The arming winding 50 is connected to a pair of arming signal input terminals 51 and 52. An inhibiting transformer 53 has a secondary winding 54 connected between the input transformer secondary winding 30 and the negative bias supply 31. Assuming that the saturable core 49 is initially in the unit state, a negative trigger applied across the trigger input winding 29, shifts core 49 to the naught state. The windings of the input transformer 28 are connected so as to invert the trigger input pulse and apply a positive voltage pulse to the amplifier grid electrode 21. This positive voltage pulse is of sufficient magnitude to overcome the cut off bias applied to the amplifier 18, and the amplifier 18 commences to conduct current in the same manner as described above for amplifier 13 of FIG. 1. The conduction of current through the amplifier 18 terminates upon saturation of the saturable core 12 in the naught condition. Current flow through the driving winding 14 thereupon causes the saturable core 12 to return to the saturated unit condition.

So long as the saturable core 49 remains in the naught state, the flux change in the saturable core 49 caused by the application of a trigger pulse across the input winding 29 induces only a relatively small voltage across the input transformer secondary winding 30. This small voltage is insufficient to cause the amplifier 18 to conduct. Therefore, prior to the next conduction cycle of the amplifier 18, it is necessary to place the saturable core 49 in the unit sense. The application of a negative arming signal voltage across the input transformer arming winding 50 causes the saturable core 49 to assume the unit condition.

Even though an arming signal has caused the saturable core 49 to assume the unit state, for certain applications it is desired to inhibit the operation of the circuit upon application of the next trigger pulse. The application of a positive inhibiting signal voltage across an inhibiting transformer primary winding 55 causes a negative voltage to be induced across the inhibiting transformer secondary winding 54. This negative voltage induced across the inhibiting transformer secondary winding 54 increases the effective negative bias applied to the amplifier 18 through the input transformer secondary winding 30. Therefore, if the inhibiting signal is applied to the inhibiting transformer 53 coincident with the application of the trigger pulse to the input transformer 28, the resultant voltage applied to the amplifier 18 as grid bias is the algebraic sum of the negative bias supply voltage, the negative voltage induced across the inhibiting transformer secondary winding 54, and the positive voltage induced across the input transformer secondary winding 30. So long as these voltages are such that their algebraic sum is more negative than the cut off voltage of the amplifier 18, amplifier 18 will not conduct.

The invention claimed is:

1. A regenerative monostable circuit, comprising: a saturable magnetic core in a normal state of magnetization; a source of trigger signals; first driving means magnetically coupled with said core and responsive solely to a trigger signal to drive said core to a state of magnetization opposite said normal state; an input circuit connected solely between said source of trigger signals and said first driving means to couple trigger signals solely to said first driving means; second driving means magnetically coupled with said core and responsive to the cessation of magnetic flux change from said normal state to said opposite state in said core for driving said core to said normal state of magnetization; first electromotive coupling means coupling said first driving means and said core sufficiently to said second driving means to control said second driving means to drive said core to said normal state of magnetization; and second electromotive coupling means coupling said second driving means and said core to said first driving means to a degree insufficient to control said first driving means to drive said core to said state of magnetization opposite said normal state.

2. A regenerative monostable circuit arranged to produce an output signal in response to a single trigger signal, comprising: a saturable magnetic core in a normal state of magnetization; a source of trigger signals;

first driving means magnetically coupled with said core and responsive solely to a trigger signal to drive said core to a state of magnetization opposite said normal state; an input circuit connected solely between said source of trigger signals and said first driving means to couple trigger signals solely to said first driving means; second driving means magnetically coupled with said core and responsive to the cessation of magnetic flux change from said normal state to said opposite state in said core to drive said core to said normal state of magnetization; first electromotive coupling means coupling said core to said second driving means, said coupling alone being insufficient to control said second driving means to drive said core to said normal state of magnetization; second electromotive coupling means coupling said first driving means to said second driving means, said second coupling means combined with said first coupling means being sufficient to control said second driving means to drive said core to said normal state of magnetization; third electomotive coupling means coupling said second driving means and said core to said first driving means to a degree insufficient to control said first driving means to drive said core to said state of magnetization opposite said normal state; and output means responsive to changes in the magnetic flux in said core to generate a single output signal in response to each trigger signal applied to said input circuit.

3. A regenerative monostable circuit, comprising: a saturable magnetic core in a normal state of magnetization; a source of trigger signals; a first driving circuit coupled to said core and responsive solely to a trigger signal to conduct current for driving said core to a state of magnetization opposite said normal state; an input circuit connected solely between said source of trigger signals and said first driving circuit for coupling trigger signals solely to said first driving circuit; a first driving winding wound on said core and connected to said first driving circuit to drive said core to said state of magnetization opposite said normal state upon conduction of said first driving circuit; a second driving circuit coupled to said core to conduct current for driving said core to said normal state of magnetization; a second driving winding wound on said core and connected to said second driving circuit to drive said core to said normal state of mangetization upon conduction of said second driving circuit; a first feedback winding wound on said core and connected to said first driving circuit for coupling magnetic flux changes in said core and said first and second driving windings to said first driving circuit to a degree insufficient to control said first driving circuit to drive said core to a state of magnetization opposite said normal state; and a second feedback winding connected to said second driving circuit and wound on said core adjacent said first driving winding to effect substantial air coupling from said first driving winding to said second feedback winding and to effect coupling from said core to said second feedback winding, the combination of said air and core coupling being sufficient to control said second driving circuit to drive said core to said normal state of magnetization.

4. A regenerative monostable circuit, comprising: a saturable magnetic core normally biased in a first state of magnetization; a source of trigger signals; first driving means responsive solely to a trigger signal to drive said core to a state of magnetization opposite said normal state; an input circuit connected solely between said source of trigger signals and said first driving circuit to couple trigger signals solely to said first driving circuit; and bias driving means coupled to said core to normally maintain said core in said biased first state of magnetization and to drive said core to said first state of magnetization from said opposite state upon the cessation of magnetic flux change in said core in the direction of said opposite state.

5. A regenerative monostable circuit, comprising: a first saturable magnetic core normally biased in a first state of magnetization; a second saturable core having input means, arming means, and an output; a source of trigger signals coupled to said input means; first driving means responsive solely to a trigger signal to drive said core to a state of magnetization opposite said normal state; a gated trigger signal input circuit including said second saturable core connected between said source of trigger signals and said first driving means, said connection being the sole connection of trigger signals to said regenerative monostable circuit to couple trigger signals solely to said first driving circuit to control said first driving circuit to drive said first core to said state of magnetization opposite said normal state; means for applying control signals to said input circuit to control the transmission of trigger signals through said input circuit to said first driving means; and bias driving means coupled to said first core to normally maintain said first core in said biased first state of magnetization and to drive said first core to said biased first state of magnetization from said opposite state upon the cessation of magnetic flux change in the direction of said opposite state.

6. A regenerative monostable circuit, comprising: a first saturable magnetic core normally biased to a first state of magnetization; a first driving winding on said first saturable core; a source of trigger signals; a first driving circuit connected to said first driving winding and responsive solely to a trigger signal to energize said winding to drive said first core to a state of magnetization opposite said first state; a second saturable core; an input winding wound on said second core and connected to said source to couple trigger signals solely to said second core to set the second core to a first state of magnetization; an output winding wound on said second core and connected solely to said first driving circuit to couple trigger signals from said second core solely to said first driving circuit; an arming winding wound on said second core; a source of arming signals connected to said arming winding to drive said second core to a state of magnetization opposite said first state; an inhibit circuit connected to said first driving circuit to selectively inhibit the effect on said first driving circuit of trigger signals coupled to said first driving circuit; a source of driving potential; and a bias driving winding wound on said first core and connected to said source of potential to normally maintain said first core in said biased first state of magnetization and to drive said first core to said biased first state of magnetization from said opposite state upon the cessation of magnetic flux change in the direction of said opposite state.

7. A regenerative monostable circuit, comprising: a saturable magnetic core in a normal stable state of magnetization, said core being of the type having rectangular hysteresis loop characteristics; a source of trigger signals, in response to each of said signals said core is driven through a single cycle of change from said normal stable state of magnetization to an unstable saturated state of magnetization opposite said normal state and then returned to said stable normal state to complete the cycle; first driving means magnetically coupled with said saturable core and responsive solely to a trigger signal from said source to drive said core to the unstable saturated state of magnetization opposite said normal state; an input circuit connected solely between said source of trigger signals and said first driving means to couple trigger signals solely to said first driving means; second driving means magnetically coupled with said saturable core and responsive to the saturation of said core in the unstable state opposite said normal state to drive said core to the normal stable state of magnetization; and output means responsive to a single cycle of change in the magnetic flux in said saturable core to generate an output signal corresponding to each trigger signal applied to said input circuit.

References Cited in the file of this patent

UNITED STATES PATENTS

| | | |
|---|---|---|
| 2,708,241 | Bess | May 10, 1955 |
| 2,772,370 | Bruce et al. | Nov. 27, 1956 |
| 2,774,878 | Jensen | Dec. 18, 1956 |
| 2,783,384 | Bright et al. | Feb. 26, 1957 |
| 2,785,236 | Bright et al. | Mar. 12, 1957 |
| 2,801,345 | Eckert | July 30, 1957 |
| 2,873,371 | Van Allen | Feb. 10, 1959 |